(12) United States Patent
Stabenau

(10) Patent No.: US 7,783,418 B2
(45) Date of Patent: Aug. 24, 2010

(54) NAVIGATION ARRANGEMENT BASED ON COORDINATE FIELDS

(75) Inventor: Daniel Stabenau, Hamburg (DE)

(73) Assignee: NXP B.V., Eindhoven (NL)

( * ) Notice: Subject to any disclaimer, the term of this patent is extended or adjusted under 35 U.S.C. 154(b) by 1078 days.

(21) Appl. No.: 10/508,964

(22) PCT Filed: Mar. 17, 2003

(86) PCT No.: PCT/IB03/01034

§ 371 (c)(1),
(2), (4) Date: Sep. 23, 2004

(87) PCT Pub. No.: WO03/081178

PCT Pub. Date: Oct. 2, 2003

(65) Prior Publication Data

US 2005/0165544 A1    Jul. 28, 2005

(30) Foreign Application Priority Data

Mar. 23, 2002 (DE) ............................... 102 13 150

(51) Int. Cl.
*G01C 21/00* (2006.01)
(52) U.S. Cl. .................... 701/208; 340/990
(58) Field of Classification Search ......... 701/200–203, 701/207–209, 211–213; 340/990, 995
See application file for complete search history.

(56) References Cited

U.S. PATENT DOCUMENTS

| 5,944,768 | A  | * | 8/1999 | Ito et al. ..................... 701/200 |
| 6,336,073 | B1 | * | 1/2002 | Ihara et al. .................. 701/202 |
| 6,366,852 | B2 | * | 4/2002 | Irie et al. .................... 701/211 |
| 6,847,889 | B2 | * | 1/2005 | Park et al. ................... 701/209 |
| 6,907,345 | B2 | * | 6/2005 | Shipley et al. .............. 701/212 |
| 7,013,242 | B1 | * | 3/2006 | Gilmartin et al. ........... 702/189 |
| 2002/0128768 | A1 | * | 9/2002 | Nakano et al. ............... 701/202 |

* cited by examiner

*Primary Examiner*—Dalena Tran

(57) ABSTRACT

An arrangement for navigation to predetermined destinations within a search area, which is divided up by means of a linear system of coordinates into coordinate fields, wherein, by means of automatic positioning at predetermined time intervals, that coordinate field is determined in which the arrangement is situated, wherein a database is provided which contains for each coordinate field a data record with a description of the current coordinate field and a description of the next coordinate field to be located in order to reach the destination, wherein the arrangement displays from the database to a user, who has input one of the predetermined destinations into the arrangement, the description of each new coordinate field as it is reached and the description of the next coordinate field provided for reaching the destination.

14 Claims, 2 Drawing Sheets

Figure 1:
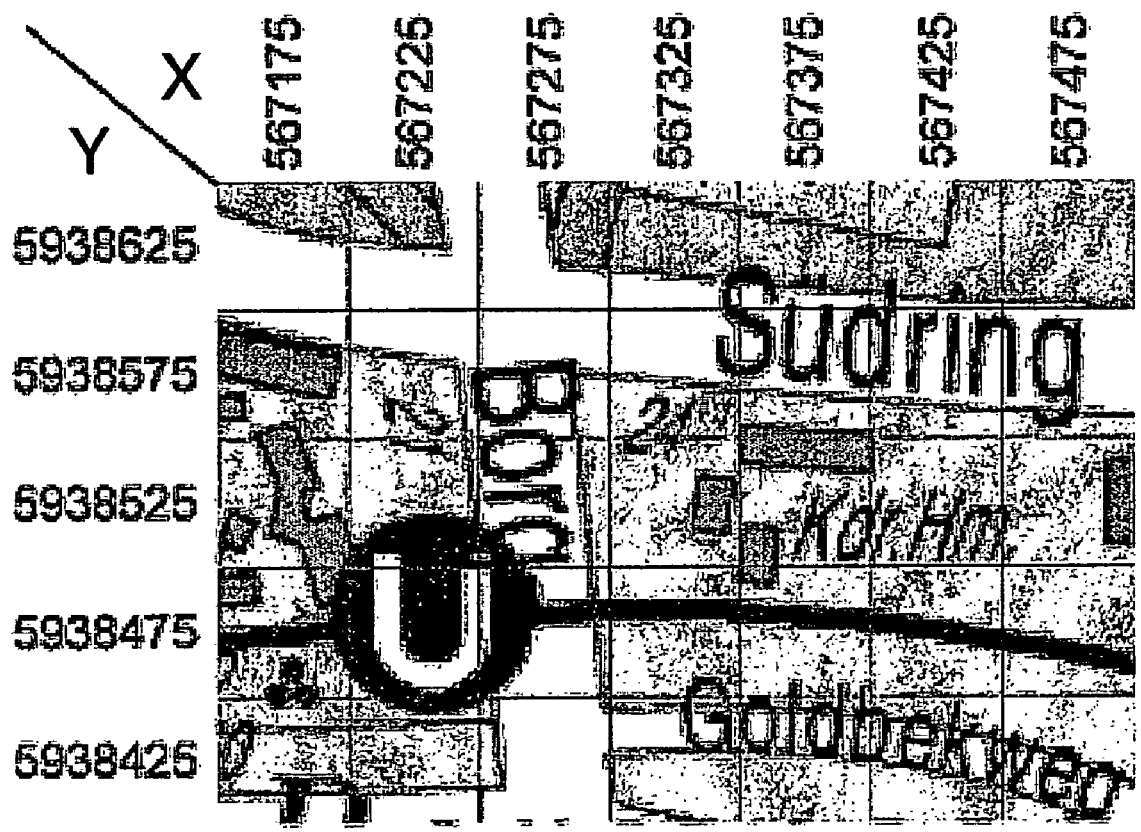

| X | Y | A | B |
|---|---|---|---|
| 567175 | 5938625 | Südring 10-17 | Südring 19, Borgweg 21 |
| 567175 | 5938575 | | Südring 19, Borgweg 23 |
| 567175 | 5938525 | | Südring 19, Borgweg 23 |
| 567175 | 5938475 | | Wiesendamm 160 |
| 567175 | 5938425 | Wiesendamm 160 | Wiesendamm 155 |
| 567225 | 5938625 | Südring 19, Borgweg 21 | Südring 24, Borgweg 23 |
| 567225 | 5938575 | Südring 19, Borgweg 23 | Südring 24, Borgweg 23 |
| 567225 | 5938525 | | Borgweg 25-27 |
| 567225 | 5938475 | U3 Borgweg | X |
| 567225 | 5938425 | Wiesendamm 155 | Borgweg 33 Goldbekweg 17 |
| 567275 | 5938625 | Borgweg 22, Südring 23 | Borgweg 33, Südring 23 |
| 567275 | 5938575 | Borgweg 24, Südring 23 | Borgweg 25-27 |
| 567275 | 5938525 | Borgweg 25-27 | Borgweg 28-31 |
| 567275 | 5938475 | Borgweg 28-31 | U3 Borgweg |
| 567275 | 5938425 | Borgweg 33, Goldbekweg 17 | Borgweg 33, Goldbekweg 17 |
| 567325 | 5938625 | Südring 23-34 | Borgweg 24, Südring 23 |
| 567325 | 5938575 | Südring 24-35 | Borgweg 24, Südring 23 |
| 567325 | 5938525 | | Borgweg 25-27 |
| 567325 | 5938475 | | Borgweg 28-31 |
| 567325 | 5938425 | Goldbekweg 15 | Borgweg 33, Goldbekweg 17 |
| 567375 | 5938625 | | Südring 36-47 |
| 567375 | 5938575 | Südring 36-47 | Südring 24-35 |
| 567375 | 5938525 | | Südring 36-47 |
| 567375 | 5938475 | | Goldbekweg 13 |
| 567375 | 5938425 | Goldbekweg 13 | Goldbekweg 15 |

FIG.2

NAVIGATION ARRANGEMENT BASED ON COORDINATE FIELDS

The invention relates to an arrangement for navigation to predetermined destinations within a search area.

With known navigation arrangements, calculation of the route to a destination is performed continuously, on the basis of the location determined for example by continuous positioning. For this, possible predetermined routes are used, which are stored in a database. Updated calculation of the most favorable route to the destination is continuously performed as the arrangement moves. The main disadvantage of such navigation arrangements is that considerable computing power is necessary for calculating the optimum route in each case. This is disadvantageous especially in mobile arrangements and is all the more so if such arrangements are to be used in the smallest possible devices and are not provided in a vehicle for example.

It is an object of the invention to provide a navigation arrangement which manages with a minimum amount of computing power and may therefore advantageously be used in mobile devices.

This object is achieved according to the invention by the features of claim 1:

An arrangement for navigation to predetermined destinations within a search area, which is divided up by means of a linear system of coordinates into coordinate fields, wherein, by means of automatic positioning at predetermined time intervals, that coordinate field is determined in which the arrangement is situated, wherein a database is provided which contains for each coordinate field a data record with a description of the current coordinate field and a description of the next coordinate field to be located in order to reach the destination, wherein the arrangement displays from the database to a user, who has input one of the predetermined destinations into the arrangement, the description of each new coordinate field as it is reached and the description of the next coordinate field provided for reaching the destination.

The arrangement according to the invention operates with a database, for which the search area, in which both the current location of the arrangement and the destination sought are situated, is divided into coordinate fields. To this end, a linear system of coordinates is used, such that each coordinate field is designated by an X and a Y coordinate. A data record is stored in the database for each predetermined destination. In addition to the coordinates of the coordinate field, this data record contains a description of the current coordinate field and a description of the next coordinate field to be located in order to reach the destination.

The description of the coordinate field is a description which indicates to the user of the arrangement one or more distinctive points of the coordinate field. These may for example be street names, distinctive buildings or the like. The description of the next coordinate field to be located is arranged similarly.

Continuous positioning of the arrangement is effected by means of an automatic positioning system, which detects the current position at predetermined intervals, such that the arrangement may determine therefrom the coordinate field in which it is situated.

When navigation to a predetermined destination is required, therefore, it is known from this continuous positioning of the arrangement, in which coordinate field it is situated. The arrangement displays the description of this coordinate field to the user. Moreover, it shows him/her the description of that coordinate field which needs to be located next in order to reach the destination. The arrangement may read these data out from the data record assigned to the selected destination.

In this way, the description of a new coordinate field is displayed as each new field is reached, together with the description of the next coordinate field to be located. In this way, the user may readily find his/her way to the predetermined destination by means of these descriptions.

These descriptions of respective coordinate fields may be stored in the database for a plurality of predetermined destinations. The user selects one of the predetermined destinations and is then guided to the destination in the above-described manner by means of the arrangement.

The advantage of this arrangement is that it does not itself have to perform any calculations, but may directly display the route from the results of the automatic positioning file and the database data records already present. Extensive calculations as performed by known navigation systems are not necessary.

These advantages are particularly noticeable when using the arrangement according to the invention in mobile, generally small devices. The disadvantage of the relatively large memory requirement for storing the data records in the database is of increasingly less significance, since ever larger mass storage devices may be obtained in highly integrated form at low prices.

According to one development of the invention as claimed in claim 2, continuous, automatic positioning may advantageously be performed for example by means of the known Global Positioning System (GPS).

According to another development of the invention as claimed in claim 3, the system of coordinates is a linear system of coordinates with XY coordinates, which divides the search area into equally-sized 50 m×50 m coordinate fields. Such subdivision is advantageous for arrangements for mobile use, since in urban areas for example such a division results in a size of coordinate field which makes them easily distinguishable for a user by means of distinctive points and on the other hand is not so large that ambiguous routes often result.

Given the ever cheaper availability of large mass storage devices in small integrated circuits, the database may advantageously, as provided according to a further development of the invention, be situated in the arrangement itself, i.e. in a mobile unit.

As is provided according to a further development of the invention as claimed in claim 5, the memory may however also be provided in decentralized manner in a server which the arrangement accesses by means of a radio link.

This mobile access is especially advantageous when the arrangement, as provided according to a further development of the invention as claimed in claim 6, is situated in a cell phone which makes available anyway the radio link then necessary.

The database may, if provided in centralized manner, as is provided according to a further development of the invention as claimed in claim 7, advantageously be provided for a plurality of arrangements or users that may access the database.

The database may also however, as provided according to a further development of the invention as claimed in claim 8, be individually designed for one user and his/her requirements. In this case, the predetermined destinations in particular may be individually tailored to the user.

Furthermore, a user of the arrangement according to the invention in a further development as claimed in claim 9 is in a position to add to the data records provided in the database additional personal destinations in such a form that additional data records are set up in the database for these destinations.

The user may then him/herself indicate the descriptions of the coordinate field in each case current and of the coordinate field to be located next. In this way, he/she may input personal destinations into the database relatively simply, to which he/she may then be guided in the event of subsequent use by means of the arrangement according to the invention.

The invention will be further described with reference to examples of embodiments shown in the drawings to which, however, the invention is not restricted. In the Figures:

FIG. 1 is a schematic representation of part of a search area for the arrangement according to the invention and FIG. 2 shows a data record for a predetermined destination with the descriptions of the coordinate fields, wherein some of the coordinate fields of the illustration according to FIG. 1 are recorded in the data record according to FIG. 2.

The navigation arrangement according to the invention may be provided for example, in a manner not illustrated in the drawings in any more detail, as a small processor within a cell phone or another mobile device.

This navigation arrangement is intended to guide a user to a predetermined destination, which the user may select. To this end a search area, in which the predetermined destination is situated, is divided into coordinate fields by means of a linear system of coordinates. The current location of the arrangement and thus of the user is detected by means of an automatic positioning system, which at given intervals determines the current coordinate field in which the arrangement is situated.

Such a positioning system may for example be a system operating according to the Global Positioning System (GPS).

FIG. 1 shows an example of a portion of a search area. FIG. 1 shows that the search area is divided by means of a linear system of coordinates into coordinate fields which each bear X and Y coordinates. The search area is normally substantially larger; the illustration according to FIG. 1 was selected with relatively few coordinate fields merely for the sake of clarity.

Each coordinate field in the illustration according to FIG. 1 thus bears an X and a Y coordinate. A database is provided which is provided in the arrangement or in decentralized manner in a server and which generally contains a plurality of data records, wherein each data record is in each case provided for a predetermined destination.

All the coordinate fields of the search area are entered in each data record. For each coordinate field, the X and Y coordinates thereof are entered in the data record. Moreover, a description is stored in the data record for the relevant coordinate field. In addition, for each coordinate field that coordinate field is stored in the data record which guides the user to the predetermined destination to which the data record is assigned. For this coordinate field, a description is likewise stored in the data record.

If the arrangement, and thus a user of the arrangement, is situated in one of the coordinate fields, the description thereof is thus displayed. In addition, the X and Y coordinates of this coordinate field may also be displayed. The arrangement determines which is the relevant coordinate field by means of the automatic positioning system.

If the user has previously input a predetermined destination, that coordinate field in which it is advantageous for the user of the arrangement to move in order to reach the predetermined destination is determined by means of the assigned data record on the one hand and the coordinate field in which the user and thus the arrangement are situated on the other hand. The arrangement displays a description of this coordinate field to the user.

If the arrangement and the user then move into this coordinate field, this new coordinate field is detected as the current coordinate field by the automatic positioning system and displayed as explained above. For this current coordinate field too, that coordinate field is again saved in the data record, into which it is advantageous for the user of the arrangement to move. Once he/she has done that, this process is repeated until the destination is finally reached.

FIG. 2 is a schematic representation of a data record for part of the search area according to FIG. 1.

FIG. 2 thus shows only a portion of a single data record, which serves, in the example according to the drawing, for example in finding the underground station in the coordinate field with the X coordinate 567225 and the Y coordinate 5938475 illustrated in FIG. 1.

If the arrangement is firstly located for example in the coordinate field with the X coordinate 567275 and the Y coordinate 5938625, the arrangement displays the description of this coordinate field which is entered in column A of the data record according to FIG. 2, i.e. "Borgweg 22, Südring 23". This constitutes a description by means of which the user of the arrangement may identify the surrounding area. In column B of the schematic representation of the data record in FIG. 2, the description of that coordinate field is entered into which it is advantageous for the user to move, in order to reach the underground station. In the example according to FIG. 2, this description reads "Borgweg 24, Südring 23". In column B, that coordinate field is again entered into which the user should move, i.e. "Borgweg 25-27", which is in turn displayed to the user.

This process is repeated until the coordinate field 5672525/5938475 and thus the underground station is reached.

The explanation of the arrangement according to the invention as illustrated in FIGS. 1 and 2 is restricted to a predetermined destination and to a relatively small search area. It would normally be possible to select a plurality of predetermined destinations, for each of which a data record has then to be provided.

The arrangement according to the invention may be used to be particular advantage in mobile devices, because it merely accesses prepared data and does not have to perform any calculation of the optimum route.

The database which the arrangement according to the invention accesses may be provided either in the arrangement according to the invention itself or in decentralized manner, such that a plurality of users may have access thereto. If the arrangement according to the invention is provided in a cell phone, for example, access to a decentralized server does not present any problems.

The database may be provided centrally for the joint use of a plurality of users, such that it contains predetermined destinations which may be selected by all users. However, a user of an arrangement according to the invention may also build up additional data records for personal destinations. To this end, the arrangement may advantageously be so designed that it enables descriptions as illustrated in FIG. 2 corresponding to new data records to be input by the user. The user may thus build up further data records for personal destinations.

The invention claimed is:

1. An arrangement for navigation to predetermined destinations within a search area, which is divided up by means of a linear system of coordinates into coordinate fields, wherein, by means of automatic positioning at predetermined time intervals, that coordinate field is determined in which the arrangement is situated, wherein the arrangement displays to a user, who has input one of the predetermined destinations into the arrangement, navigation information, wherein the navigation information includes:
  a description of the current coordinate field; and
  a description of the next coordinate field for reaching the destination;
  wherein the navigation information is obtained directly from a data record in a database without having to calculate a route.

2. An arrangement as claimed in claim 1, characterized in that automatic positioning is performed by means of the Global Positioning System.

3. An arrangement as claimed in claim 1, characterized in that the coordinate system comprises a linear system of coordinates with x, y coordinates which divides the search area into coordinate fields of 50 meters by 50 meters.

4. An arrangement as claimed in claim 1, characterized in that the database is situated locally in the arrangement.

5. An arrangement as claimed in claim 4, characterized in that the database is provided individually for one arrangement and the users thereof.

6. An arrangement as claimed in claim 1, characterized in that the database is situated in a central memory/server, which the arrangement accesses by means of a radio link.

7. An arrangement as claimed in claim 6, characterized in that the arrangement is located in a cell phone.

8. An arrangement as claimed in claim 6, characterized in that the database is provided centrally for a plurality of arrangements and users.

9. An arrangement as claimed in claim 8, characterized in that a user of the arrangement may record in the database personal destinations and enter him/herself in the data records descriptions for the current coordinate field and the next coordinate field to be located in order to reach the destination.

10. An arrangement for navigation to predetermined destinations within a search area, which is divided up by means of a linear system of coordinates into coordinate fields, wherein, by means of automatic positioning at predetermined time intervals, that coordinate field is determined in which the arrangement is situated, wherein the arrangement displays to a user, who has input one of the predetermined destinations into the arrangement, navigation information, wherein the navigation information includes:
  a description of the current coordinate field; and
  a description of the next coordinate field for reaching the destination;
  wherein the navigation information is obtained directly from a data record in a database; and
  wherein no navigation related calculation is performed using at least one data record in the database to obtain the navigation information, characterized in that a user of the arrangement may record in the database personal destinations and enter him/herself in the data records descriptions for the current coordinate field and the next coordinate field to be located in order to reach the destination.

11. An arrangement as claimed in claim 10, characterized in that automatic positioning is performed by means of the Global Positioning System.

12. An arrangement as claimed in claim 10, characterized in that the coordinate system comprises a linear system of coordinates with x, y coordinates which divides the search area into coordinate fields of 50 meters by 50 meters.

13. An arrangement as claimed in claim 10, characterized in that the database is situated locally in the arrangement.

14. An arrangement as claimed in claim 10, characterized in that the database is situated in a central memory/server, which the arrangement accesses by means of a radio link.

* * * * *